US012135858B2

(12) United States Patent
Xiong

(10) Patent No.: US 12,135,858 B2
(45) Date of Patent: Nov. 5, 2024

(54) METHOD AND SYSTEM FOR DISPLAYING AND INTERACTING WITH COMMENTS

(71) Applicant: SHANGHAI BILIBILI TECHNOLOGY CO., LTD., Shanghai (CN)

(72) Inventor: Mengyuan Xiong, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 4 days.

(21) Appl. No.: 18/084,107

(22) Filed: Dec. 19, 2022

(65) Prior Publication Data

US 2023/0195276 A1 Jun. 22, 2023

(30) Foreign Application Priority Data

Dec. 20, 2021 (CN) .......................... 202111564022.7

(51) Int. Cl.
*G06F 3/048* (2013.01)
*G06F 3/0481* (2022.01)
*G06T 13/80* (2011.01)

(52) U.S. Cl.
CPC ............ *G06F 3/0481* (2013.01); *G06T 13/80* (2013.01)

(58) Field of Classification Search
CPC . G06F 3/0481; G06F 40/169; H04N 21/2187; H04N 21/4312; H04N 21/4532; H04N 21/858
See application file for complete search history.

(56) References Cited

U.S. PATENT DOCUMENTS

| | | | |
|---|---|---|---|
| 2013/0013089 A1* | 1/2013 | Kawakami | H04N 21/8153 700/90 |
| 2013/0086463 A1* | 4/2013 | Mandal | G06T 13/00 345/473 |
| 2016/0259523 A1* | 9/2016 | Watkins | G06F 40/169 |
| 2018/0227617 A1* | 8/2018 | Zhu | H04N 21/812 |
| 2019/0158624 A1* | 5/2019 | Lin | G06Q 50/01 |
| 2019/0238488 A1* | 8/2019 | Peng | G06Q 20/0655 |
| 2020/0029119 A1* | 1/2020 | Wang | H04N 21/4318 |
| 2020/0327176 A1* | 10/2020 | Zhang | G06F 16/958 |
| 2020/0356782 A1* | 11/2020 | Liu | G06V 20/10 |
| 2020/0404380 A1* | 12/2020 | Tan | H04N 21/4788 |
| 2022/0014819 A1* | 1/2022 | Liu | H04N 21/4316 |
| 2022/0021927 A1* | 1/2022 | Liang | H04N 21/4312 |

(Continued)

*Primary Examiner* — Patrick F Riegler
(74) *Attorney, Agent, or Firm* — BakerHostetler

(57) ABSTRACT

The present application provides techniques for displaying and interacting with comments. The techniques comprise selecting a card to be displayed on a display interface from a card pool according to a preset rule; rotating the card to a target direction to obtain a target card; determining a motion track of the target card based on a motion track of a previous target card that enters the display interface immediately prior to the target card; displaying a comment on the display interface using one of a plurality of target cards, the plurality of target cards configured to move on the display interface based on a motion track corresponding to each of the plurality of target cards; and displaying an animation effect associated with a target card among the plurality of target cards in response to determining that the target card among the plurality of target cards is triggered.

17 Claims, 10 Drawing Sheets

(56) References Cited

U.S. PATENT DOCUMENTS

| | | | | |
|---|---|---|---|---|
| 2022/0078492 | A1* | 3/2022 | Yang | H04L 65/1083 |
| 2022/0086509 | A1* | 3/2022 | Geng | H04N 21/47815 |
| 2022/0176250 | A1* | 6/2022 | Teng | A63F 13/92 |
| 2022/0385979 | A1* | 12/2022 | Zhou | G06F 40/30 |
| 2023/0057963 | A1* | 2/2023 | Chen | H04N 21/4316 |
| 2023/0326115 | A1* | 10/2023 | Xiao | H04N 21/431 |
| | | | | 345/473 |
| 2023/0328330 | A1* | 10/2023 | He | H04N 21/4788 |
| | | | | 725/37 |

* cited by examiner

METHOD AND SYSTEM FOR DISPLAYING AND INTERACTING WITH COMMENTS

CROSS-REFERENCE TO RELATED APPLICATION

The present application claims priority to Chinese Patent Application No. 202111564022.7, entitled "Picture Bullet-Screen Comment Interaction Method and System", filed on Dec. 20, 2021, the disclosure of which is incorporated herein by reference in its entirety.

BACKGROUND ART

With the rapid development of live video streaming technologies, an increasing number of users may watch various live or recorded video programs via a network. In the process of watching the live or recorded video programs, users may interact with live streamers and other users by sending comments. Improved techniques of displaying comments are desirable.

SUMMARY OF THE INVENTION

Embodiments of the present application aim to provide a method and system for image bullet-screen comment interaction, a computer device, and a computer-readable storage medium, to solve the above problems.

An aspect of the embodiments of the present application provides a method for image bullet-screen comment interaction, including:
- selecting a card to be displayed from a card pool according to a preset rule; rotating the card to a target direction to obtain a target card;
- determining a motion track of the target card based on a motion track of a previous card; displaying a bullet-screen comment on a display interface by using each target card based on a motion track of the target card; and
- in response to a target bullet-screen comment in a plurality of bullet-screen comments that being triggered, displaying an animation effect associated with the target bullet-screen comment.

Optionally, the determining a motion track of the target card based on a motion track of a previous card includes:
- creating a DOM node for each target card, each DOM node being bound to a click event; and
- configuring animation code for each DOM node, the animation code being configured for defining the motion track of the target card.

Optionally, the configuring animation code for each DOM node includes:
- setting a different starting time point for the target card of each DOM node,
- where the starting time point is configured for indicating a starting time for the corresponding target card to enter the display interface.

Optionally, the configuring animation code for each DOM node includes:
- if an $i^{th}$ target card is assigned a first motion track, setting a default value for a starting point abscissa for the $i^{th}$ target card to enter the display interface, the $i^{th}$ target card being one of the plurality of target cards; and
- if the $i^{th}$ target card is not assigned the first motion track, calculating and setting, according to a starting point abscissa of an $(i-1)^{th}$ target card and a card height divided by $\sin(\alpha)$, the starting point abscissa for the $i^{th}$ target card to enter the display interface, $\alpha$ representing an included angle between the target direction and a horizontal direction of the display interface.

Optionally, a starting point abscissa minimum value ≤ the starting point abscissa of the $i^{th}$ target card ≤ a starting point abscissa maximum value;
- the starting point abscissa minimum value is equal to the width of the display interface divided by 3; and
- the starting point abscissa maximum value is equal to the width of the display interface plus the height of the display interface divided by 4 multiplied by 3;
- where if a calculation result of the starting point abscissa of the $i^{th}$ target card is greater than the starting point abscissa maximum value, the starting point abscissa minimum value is set as the starting point abscissa of the $i^{th}$ target card.

Optionally, the method further includes:
- if a click event is detected to be triggered, determining a card to be triggered that is bound to the click event; and
- hiding the card to be triggered, and displaying, by taking a click position of the click event as a starting point, a target animation effect associated with the card to be triggered.

Optionally, the target animation effect includes:
- an effect of fireworks blooming; or
- an effect of a falling star ball flying toward a target object.

Optionally, the target object is set at a predetermined position of the display interface and configured for providing a prompt of a game progress or the number of effective triggering times.

Optionally, at least some of the plurality of cards have different shapes and sizes.

Optionally, the target direction is between a horizontal mode and a vertical direction of the display interface.

Optionally, the target direction is an oblique downward direction from right to left.

An aspect of the embodiments of the present application further provides a system for image bullet-screen comment interaction, including:
- a selection module configured to select a card to be displayed from a card pool according to a preset rule;
- a rotating module configured to rotate the card to a target direction to obtain a target card; a determining module configured to determine a motion track of the target card based on a motion track of a previous card;
- a display module configured to display a bullet-screen comment on a display interface by using each target card based on a motion track of the target card; and
- a response module configured to: in response to a target bullet-screen comment in a plurality of bullet-screen comments that being triggered, display an animation effect associated with the target bullet-screen comment.

An aspect of the embodiments of the present application further provides a computer device, including a memory, a processor, and a computer program stored on the memory and executable on the processor, where the computer program, when executed by the processor, implements the steps of the foregoing method for image bullet-screen comment interaction.

An aspect of the embodiments of the present application further provides a computer-readable storage medium, including a memory, a processor, and a computer program stored on the memory and executable on the processor, where the computer program, when executed by the processor, implements the steps of the foregoing method for image bullet-screen comment interaction.

The method and system for image bullet-screen comment interaction, the computer device, and the computer-readable storage medium provided in the embodiments of the present application include the following technical effects:

First, each bullet-screen comment is rotated to the target direction, and a plurality of rotated bullet-screen comments fall along the target direction, which provides a good display effect.

Second, the motion track of the target card is determined based on the motion track of the previous card, which may effectively avoid overlapping of the plurality of target cards, thereby enhancing the interaction effect.

DETAILED DESCRIPTION OF EMBODIMENTS

Figure 1:
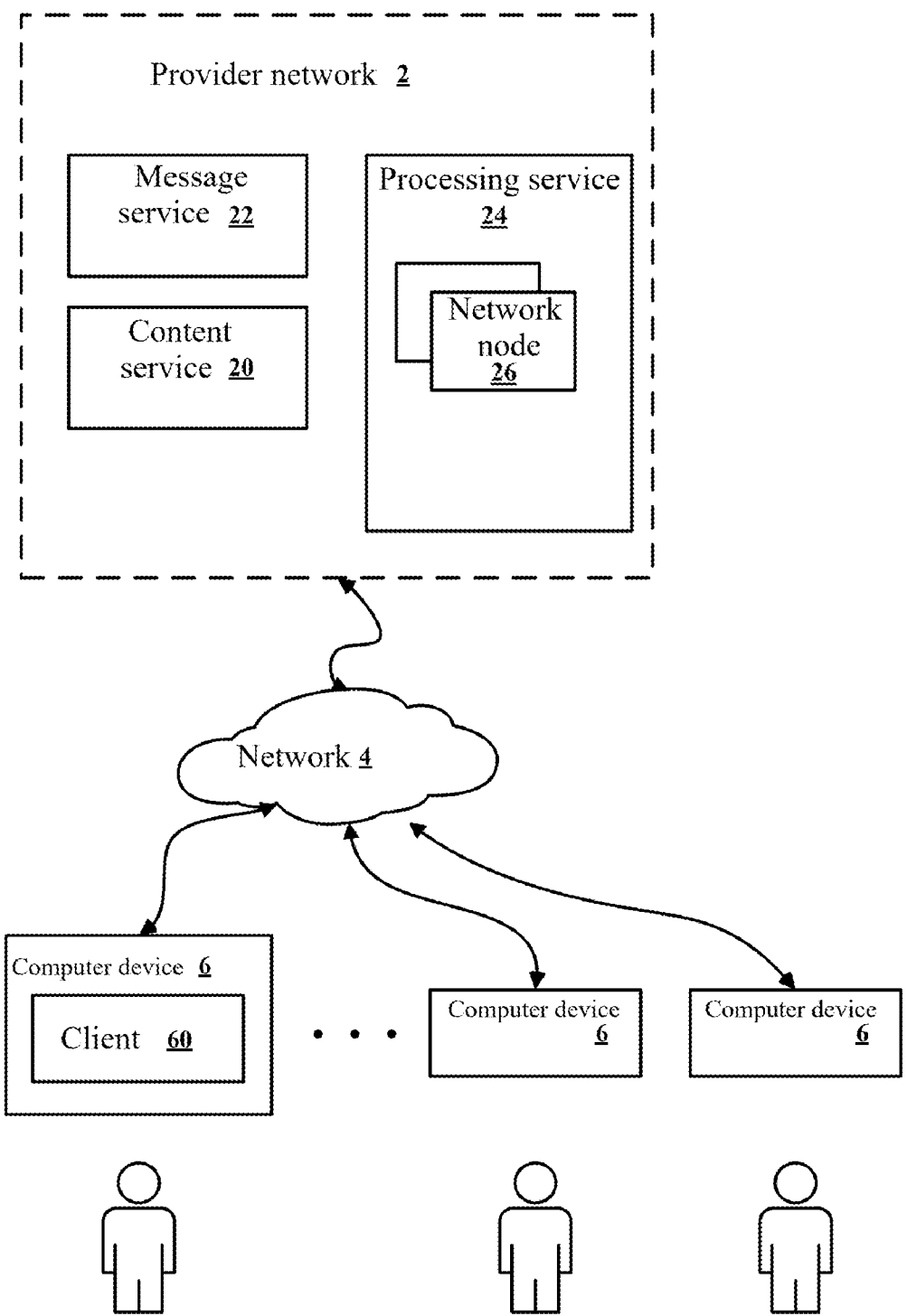
FIG. 1 is a diagram schematically showing an application environment of a method for image bullet-screen comment interaction according to an embodiment of the present application.

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments of the present application can be combined with each other, but they must be based on the implementation by those of ordinary skill in the art. When a combination of technical solutions is contradictory or cannot be implemented, it should be considered that such a combination of the technical solutions neither exists, nor falls within the protection scope claimed by the present application.

The present invention has found that technical implementations of a common red packet rain game are as follows:

1. Red packet rain is created by using canvas, and red packets using the same image fall regularly, to ensure that there is a plurality of red packets on a page.

2. When a user clicks on a red packet, whether the red packet is hit by the user is determined by comparing coordinates of the user's finger on a screen and coordinates of the red packet.

The red packet rain game only supports red packets that use one type of image to fall randomly. When a red packet is hit by the user, only the number of hitting times of red packets plus 1 is displayed, which lacks rich animation effects and cannot improve the fun of the game. In addition, when an image is rotated by using canvas, determination that the image is hit by the user is not accurate because a coordinate range of the rotated image cannot be accurately calculated.

3. A bullet-screen comment is generally displayed in a manner that text moves from right to left in a horizontal direction, and the bullet-screen comment stops moving when being clicked on, which results in a poor interaction effect. The bullet-screen comments are visible information that pops up and moves along a predetermined direction during video watching via the network. The bullet-screen comment may be referred to as a comment, danmaku, a barrage, a bullet screen, a bullet-screen comment, or the like. The bullet-screen comment allows users to post comments or thoughts. However, different from display in a dedicated comment area of a player on common video sharing sites, the bullet-screen comment appears on a video screen in a manner of horizontally sliding from right to left, to ensure that it can be noticed by all viewers. However, the bullet-screen comments described above have poor display and interaction effects, resulting in poor user experience.

In view of the above, the present application aims to provide a new solution for image bullet-screen comment interaction, in which:

1. After surprise rain starts, a plurality of bullet-screen comments in different card forms may fall randomly, and different shapes of cards are supported.

2. Different cards are displayed in a random way, which improves the interaction effect.

3. The card moves at a predetermined tilt angle (such as 45°), and whether the user's finger click is within a card area can still be accurately determined.

4. When the card is triggered in the falling process, effects of fireworks blooming and a falling star ball flying toward a target object can appear, to indicate a game progress.

Some terms defined in the present application are explained below.

Bullet-screen comment: visible information that pops up and moves along a predetermined direction during video watching via the network. There is no fixed term in English for the bullet-screen comment, which is typically referred to as: a comment, danmaku, a barrage, a bullet screen, a bullet-screen comment, or the like. The bullet-screen comment allows video viewers to post comments or thoughts.

However, different from display in a dedicated comment area of a player on common video sharing sites, the bullet-screen comment appears on a video screen in real time in a moving manner, to ensure that it can be noticed by all viewers. Some bullet-screen comment systems use a script language to provide specific bullet-screen comment forms, such as the bullet-screen comment appearing or disappearing at a specific location, controlling a pop-up speed or a location of the bullet-screen comment, and the like.

Surprise rain game: a lottery game for interaction with users. A user may trigger an effect such as fireworks explosion by clicking on a moving card on a screen, and a final winning result and the effect corresponding to the card are displayed for the user based on the number of hitting times.

Lottie: an open-source animation library of Airbnb for iOS, Android, and React Native. It can parse animations exported by Adobe After Effects, and allows native apps to use these animations as they use static images, so as to achieve animation effects.

Card: a form of a bullet-screen comment. The card may be an image or a combination of an image and text. In the surprise rain game, the card may slide, like raining, from a left side of a screen to a right side of the screen at a predetermined tilt angle until it disappears from the screen.

FIG. 1 is a schematic diagram schematically showing environment application according to an embodiment of the present application.

A provider network 2 may be connected to a computer device 6 via a network 4.

The provider network 2 may provide a content service 20, a message service 22, and a processing service 24.

(1) Content Service 20:

The content service 20 may include a content streaming service such as an Internet protocol video streaming service. The content streaming service may be configured to distribute content by using various transmission technologies. The content service 20 may be configured to provide content such as video, audio, text data, and a combination thereof. The content may include content streams (for example, video streams, audio streams, and information streams), content files (for example, video files, audio files, and text files), and/or other data.

The content service 20 may include a bullet-screen comment service. For example, bullet-screen comments are provided to the computer device 6, to allow the computer device 6 to present the bullet-screen comments on a screen, for example, in overlay images above the content. The bullet-screen comment may be displayed with an animation effect. For example, the bullet-screen comment may be displayed as the content scrolling, and this animation effect may be achieved on the basis of transition attributes of cascading style sheets 3 (CSS3).

(2) Message Service 22:

The message service 22 may be configured to receive a plurality of messages, and manage messages for different content items. The user may browse the content and access different content items to view comments on specific content, for example, comments posted by other users on the specific content. A comment, associated with a specific content item, from a user, may be output to other users viewing the specific content item. For example, all users accessing a content item (for example, a video clip) may view comments associated with the content item. The input bullet-screen comment content may be output in real time or almost in real time.

The message service 22 may be configured to process the plurality of messages. The message service 22 may queue the plurality of messages or prioritize them in other manners on the basis of information (for example, timestamps and incremental identifiers) associated with the corresponding bullet-screen comment content.

The message service 22 may be configured to process the plurality of messages through load balancing. For example, the message service 22 may be configured to use one or more of a plurality of processing nodes to process the plurality of messages, prioritize the messages, and perform load balancing on the messages. The message service 22 may at least temporarily store the plurality of messages. The message service 22 may store the plurality of messages in such as a database.

The message service 22 may be configured to process the messages by performing a grouping operation. The grouping operation may include grouping of the plurality of messages on the basis of features. If two messages have the same features or fall within a threshold range of features, the two messages may be grouped together. Messages associated with the specific content item (for example, a stream, a file, a program, a movie, a song, and a game session) may be associated with the same group. For example, a message may include or be associated with a content identifier. The content identifier may uniquely identify a content item. If the content identifier is found in a message or is associated with a message (for example, is sent separately), the message service 22 may associate the message with a group associated with the content item.

The message service 22 may be configured to perform natural language processing, topic identification, pattern identification, artificial intelligence, and the like to automatically determine a feature of a message and/or group the message. As an example, a phrase or a pattern which frequently appears may be identified as a topic. As another example, a database of a topic associated with content may be maintained. The topic may include a genre (for example, an action, a drama, and a comedy), a personality (for example, an actor, an actress, and a director), a language, and the like. Messages may be grouped on the basis of a feature of a client device and/or a user sending the messages. Demography, interest, history, and/or the like may be stored for a plurality of users to determine potential groups of messages.

The message service 22 may be further configured to process the messages by generating output data. The output data may include: first, an instruction for outputting a comment on the basis of corresponding context; second, application data for applying an overlay comment on the basis of an indication of the context; and third, an instruction for generating (for example, encoding) content corresponding to a comment.

The message service 22 may be further configured to process the messages by performing a screening process. The screening process may include rejecting or marking a message matching a screening criterion. The screening criterion may specify a term and/or a phrase, for example, profanity, a hate comment, and an indecent comment. The screening criterion may specify a character, for example, a symbol or a font. The screening criterion may specify a language such as a computer-readable code mode.

(3) Processing Service 24:

The processing service 24 may be configured to provide processing of different services. The processing service 24 may include a plurality of network nodes 26. The plurality of network nodes 26 may process a task associated with the message service 22. The plurality of network nodes 26 may be implemented as one or more computing devices, one or more processors, one or more virtual computing instances, a combination thereof, and/or the like.

The plurality of network nodes 26 may be implemented by one or more computing devices. The one or more computing devices may include a virtualized computing instance. The virtualized computing instance may include a virtual machine, for example, a simulation of a computer system, an operating system, or a server. The computing device may be used for other data of specific software (for example, an operating system, a dedicated application program, or a server) for simulation on the basis of a virtual image and/or definition, and is used for loading the virtual machine. As requirements on different types of processing services change, different virtual machines may be loaded and/or terminated on the one or more computing devices. A hypervisor may be implemented to manage use of different virtual machines on the same computing device.

In some embodiments, the plurality of network nodes 26 may process events submitted by the computer device. These events may be associated with discussions on real-time news, videos, social hotspots, reports on some user accounts, and the like. In other embodiments, the plurality of network nodes 26 may process performance evaluation of a plurality of user accounts for reviewing events in a network community. In some implementations, these services may be implemented as dedicated computing devices, dedicated processors, dedicated virtual machine instances, and/or the like. In other implementations, various nodes may implement any function associated with these services.

The provider network 2 may be located in a data center, for example, on a single site, or distributed at different geographical positions (for example, on a plurality of sites). The provider network 2 may provide services via the network 4. The network 4 includes various network devices, for example, routers, switches, multiplexers, hubs, modems, network bridges, repeaters, firewalls, proxy devices, and/or the like. The network 4 may include a physical link, such as a coaxial cable link, a twisted-pair cable link, a fiber optic link, a combination thereof, or the like, or a wireless link, such as a cellular link, a satellite link, a Wi-Fi link, or the like.

The computer device 6 may be configured to access content and a service of the provider network 2. The computer device 6 may include any type of electronic devices, for example, mobile devices, tablet devices, laptop computers, workstations, virtual reality devices, game devices, set-top boxes, digital streaming media devices, vehicle terminals, smart televisions, set-top boxes, and the like.

The computer device 6 may be associated with one or more users. A single user may access the provider network 2 using one or more of computer devices 6. The computer device 6 may travel to various positions and use different networks to access the provider network 2.

The computer device 6 may include a client 60. The client 60 outputs (for example, renders or presents) content to a user. The client 60 may be a video client (for example, a bilibili client), a browser client, a WeChat mini program based on WeChat, or the like. The content may include a video, audio, bullet-screen comment content, or the like. The bullet-screen comment content may be words, cards, and the like, and may have different colors, sizes, animations, scrolling directions, shapes, and the like.

In the following, the present application provides some solutions for image bullet-screen comment interaction by using the computer device 6 as an executive body.

In the description of the present application, it should be understood that, the reference numerals of steps do not indicate the order of execution of the steps, but are merely to facilitate the description of the present application and differentiation between the steps, and thus will not be interpreted as limiting the present application.

Embodiment 1

Figure 2:
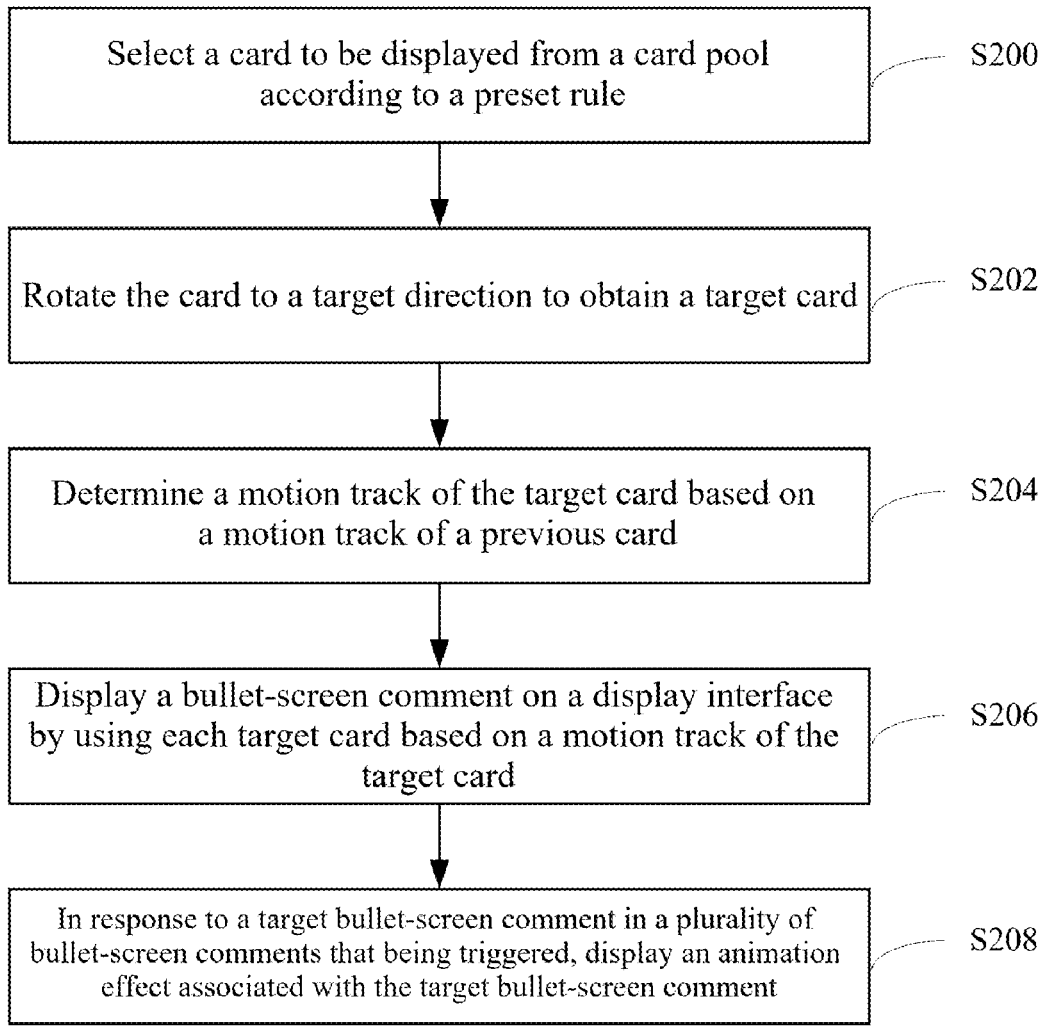
FIG. 2 is a flowchart schematically showing the method for image bullet-screen comment interaction according to Embodiment 1 of the present application.

FIG. 2 is a flowchart schematically showing the method for image bullet-screen comment interaction according to Embodiment 1 of the present application.

As shown in FIG. 2, the method for image bullet-screen comment interaction may include step S200 to step S208.

Step S200: Selecting a card to be displayed from a card pool according to a preset rule.

The card may include text, an image, and a combination thereof. The image may be static or dynamic, such as an image of a red packet. A plurality of cards may be randomly selected in batches, thereby reducing a processing burden on the computer device.

Step S202: Rotate the card to a target direction to obtain a target card.

Step S204: Determine a motion track of the target card based on a motion track of a previous target card.

Step S206: Display a bullet-screen comment (e.g., a comment) on a display interface by using each target card among a plurality of target cards based on a motion track of the target card.

Step S208: In response to detecting that a target card displaying a target bullet-screen comment (e.g., comment) in a plurality of bullet-screen comments is triggered, display an animation effect associated with the target card of displaying the target bullet-screen comment (e.g., comment).

Figure 3:
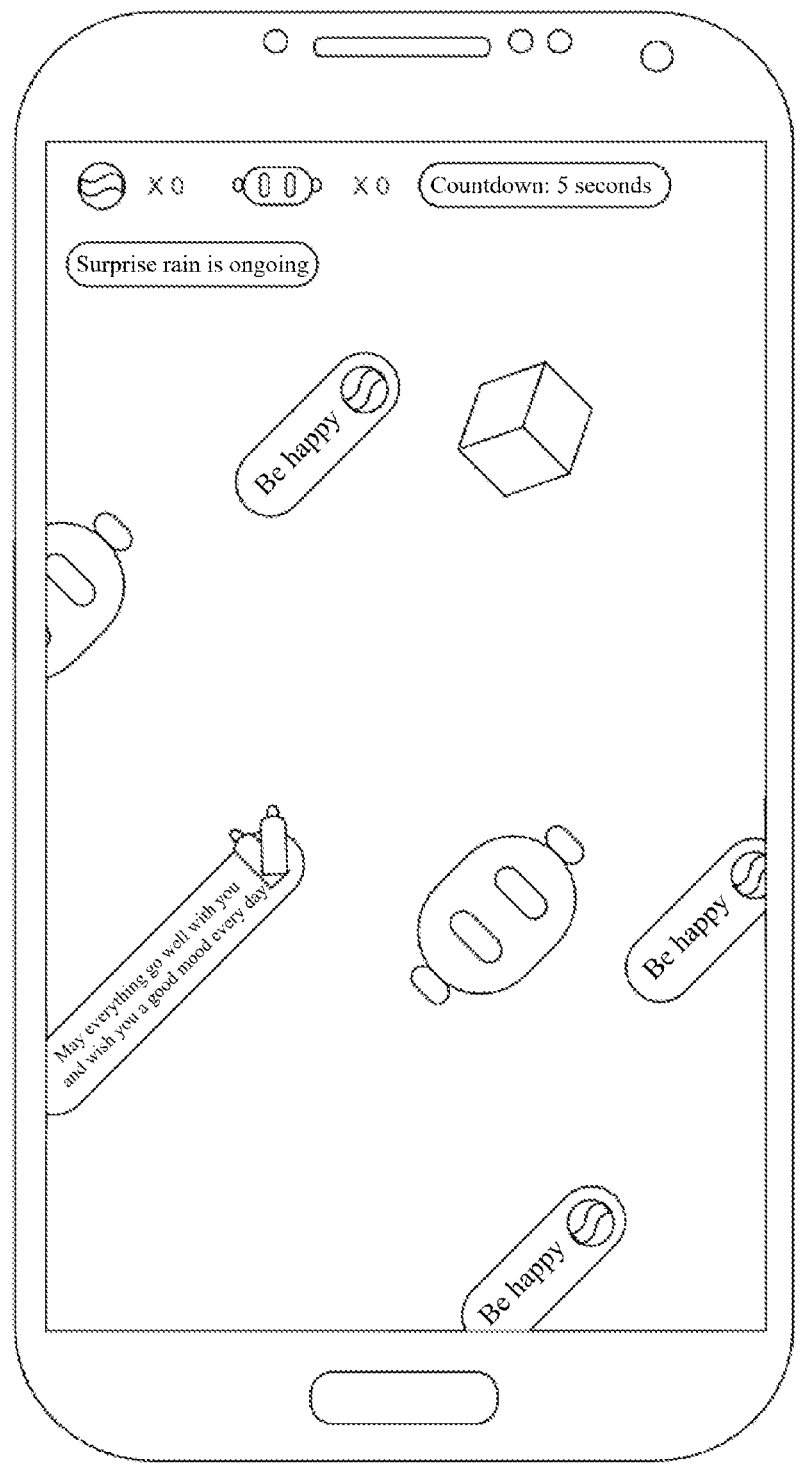
FIG. 3 schematically shows a display interface for image bullet-screen comment interaction.

The display interface may be an interface in a full screen mode as shown in FIG. 3, or an interface in a non-full screen mode.

Exemplary description is provided below with reference to FIG. 3.

(1) Video or page content is played/presented on the display interface, and a user input or a device automatic trigger event is monitored.

The user input may be a physical or virtual keyboard input, a mouse input, or may be a touch screen input.

The device automatic trigger may be an automatic trigger based on a specific time, specific presented content, or a user's associated operation.

(2) If the detected user input or device automatic trigger event is to enable a specific display function such as surprise rain, red packet rain, or the like, the corresponding function is enabled.

Referring to FIG. 3 again, after the corresponding function is enabled, a plurality of bullet-screen comments in different shapes fall randomly, and different shapes are supported. The falling is in the form that each bullet-screen comment itself is rotated to the target direction (45°), and moves along the target direction.

(3) In the process in which each bullet-screen comment falls along the target direction, the user input, such as a click based on a mouse or a touch screen, is monitored.

(4) If the user input is detected, and a trigger position of the user input exactly falls within a display area range of a target bullet-screen comment, it is determined that the target bullet-screen comment is triggered, and a corresponding animation effect is produced.

To further enhance the interaction effect, as shown in the upper left corner of FIG. 3, in response to one effective user input, a count after the corresponding category is incremented by 1, so that the user may learn of the number of effective input times of the user and the categories triggered by the user inputs.

In summary, the method for image bullet-screen comment interaction described in the embodiment of the present application includes the following technical effects:

First, each bullet-screen comment is rotated to the target direction (for example, 45°), and a plurality of rotated bullet-screen comments fall along the target direction, which provides a good display effect.

Second, in the process in which each bullet-screen comment falls along the target direction, the corresponding animation effect pops up based on the user input, which improves the interaction effect, thereby bringing good user experience.

Third, the motion track of the target card is determined based on the motion track of the previous card, which may effectively avoid overlapping of the plurality of target cards, thereby enhancing the interaction effect.

The following provides several optional embodiments, which may be performed separately or in a combined manner.

Figure 4:
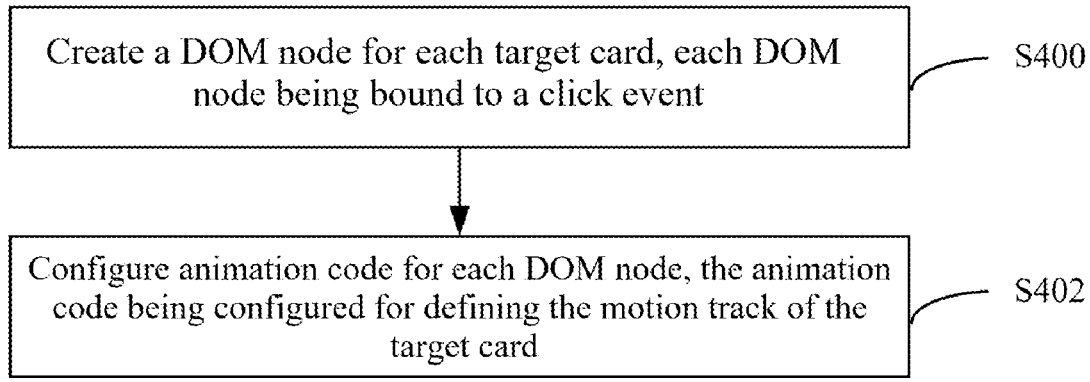
FIG. 4 is a sub-flowchart of step S204 in FIG. 2.

As an optional embodiment, the plurality of bullet-screen comments include a plurality of cards. As shown in FIG. 4, the step S204 includes: step S400: creating a DOM node for each target card, each DOM node being bound to a click event; and step S402: configuring animation code for each DOM node, the animation code being configured for defining the motion track of the target card.

Compared with the case where canvas is used for drawing and a size of a card occupying the display interface after the card is rotated cannot be accurately calculated, in this optional embodiment, a DOM node is used, that is, a DOM node is created for each target card, and each DOM node is bound to a click event, so that whether the user's click range is within the target card can be accurately determined at the time of clicking.

The animation code may be JavaScript code, CSS code, or any other code.

In this optional embodiment, the animation code includes a plurality of animation parameters, which may include: a starting time for the target card to enter the display interface, an ending time for the target card to disappear from the display interface, a start position for the target card to enter the display interface, an end position for the target card to disappear from the display interface, a motion speed of the target card in the display interface, motion duration of the target card in the display interface, a motion direction of the target card in the display interface, and the like.

Figure 5:
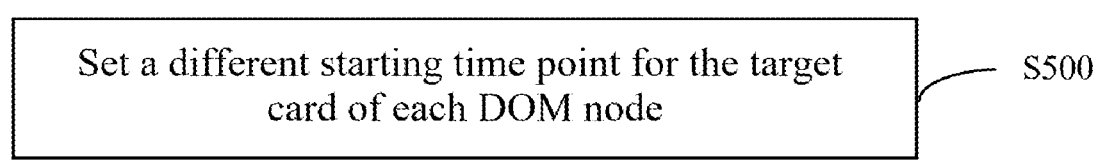
FIG. 5 is a sub-flowchart of step S402 in FIG. 4.

As an optional embodiment, as shown in FIG. 5, the step S402 may include the following step: step S500, setting a different starting time point for the target card of each DOM node, where the starting time point is configured for indicating a starting time for the corresponding target card to enter the display interface. In this optional embodiment, different starting time points (for example, an interval of 300 milliseconds) are set, motion positions of the target cards presented on the display interface are made staggered, so as to present a visual feeling of falling stars irregularly falling, thereby improving the visual experience.

Figure 6:
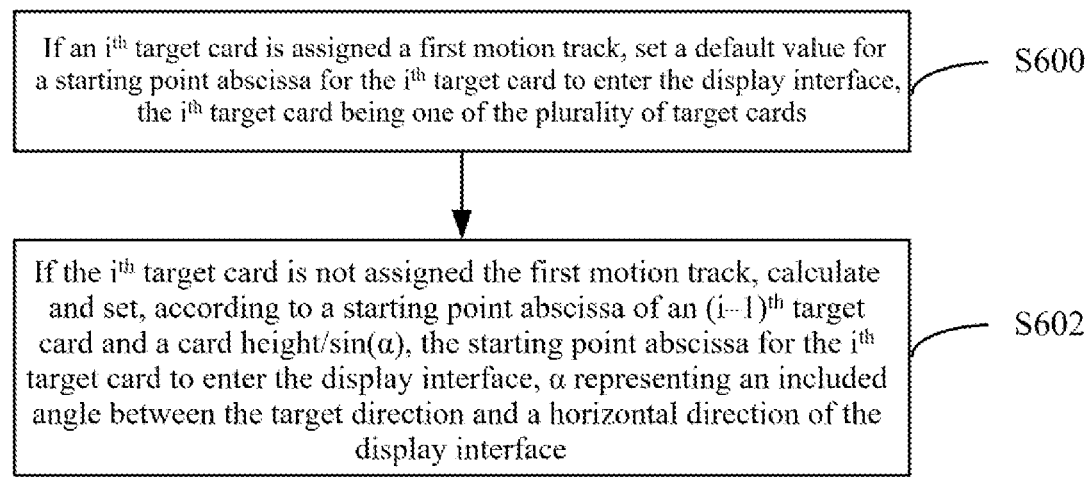
FIG. 6 is a sub-flowchart of step S402 in FIG. 4.

As an optional embodiment, as shown in FIG. 6, the step S402 may include the following steps:

step S600: if an $i^{th}$ target card is assigned a first motion track, setting a default value for a starting point abscissa for the $i^{th}$ target card to enter the display interface, the $i^{th}$ target card being one of the plurality of target cards; and step S602: if the $i^{th}$ target card is not assigned the first motion track, calculating and setting, based on an abscissa of a starting location point (i.e., a starting point abscissa) of an $(i-1)^{th}$ target card and a card height of the $i^{th}$ target card divided by $\sin(\alpha)$, an abscissa of a starting location point (i.e., a starting point abscissa) of the $i^{th}$ target card entering the display interface, wherein the $i^{th}$ target card represents one of the plurality of target cards, the $(i-1)^{th}$ target card represents a previous target card of the $i^{th}$ target card, and $\alpha$ represents an included angle between a target direction of the $i^{th}$ target card and a horizontal direction of the display interface.

In this optional embodiment, the starting point abscissas is calculated and set, so that the overlapping of the plurality of target cards may be effectively avoided in a case that each target card is along the target direction (the tilt direction).

Figure 7:
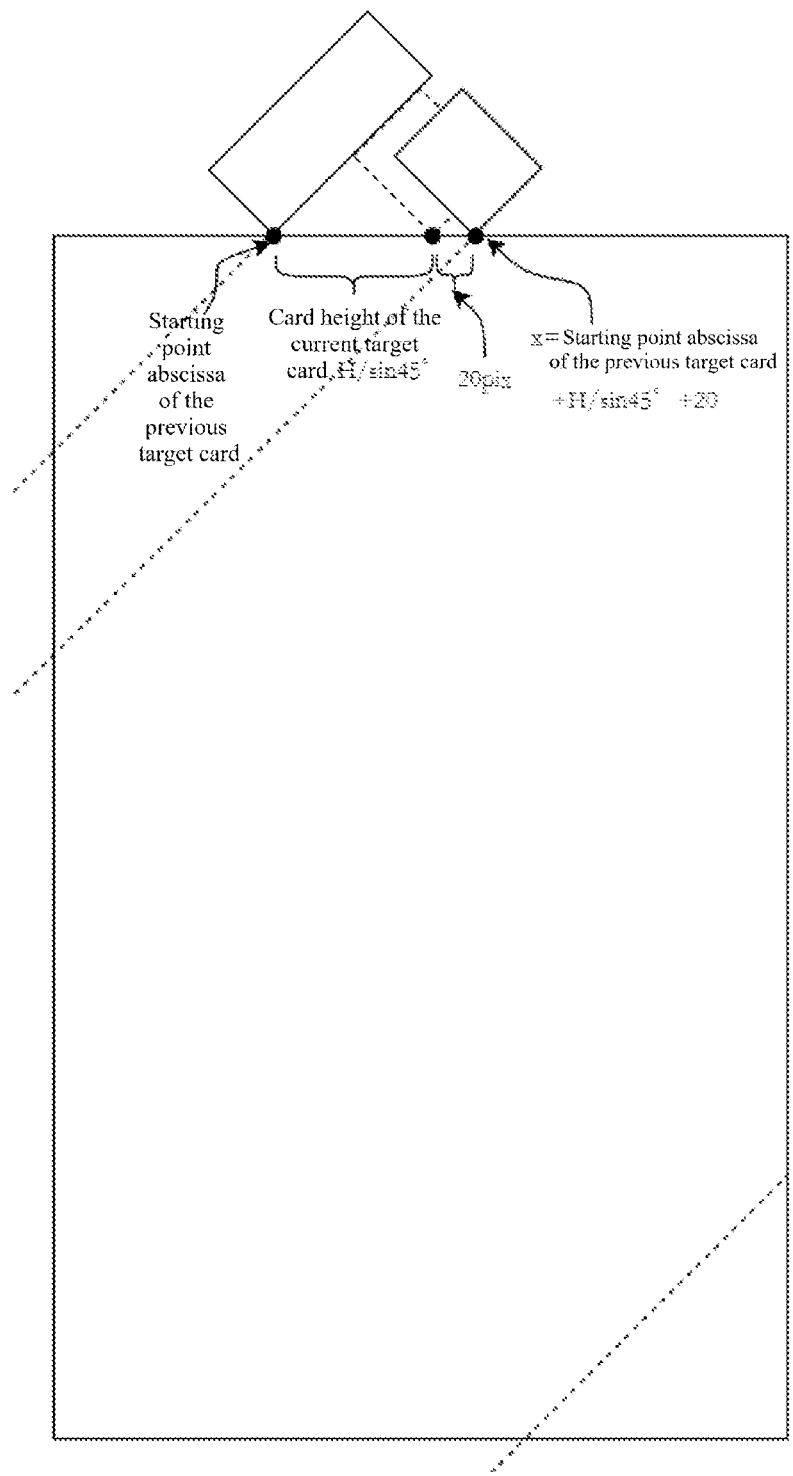
FIG. 7 is a schematic diagram schematically showing a setting of a motion track of each target card.
Figure 8:
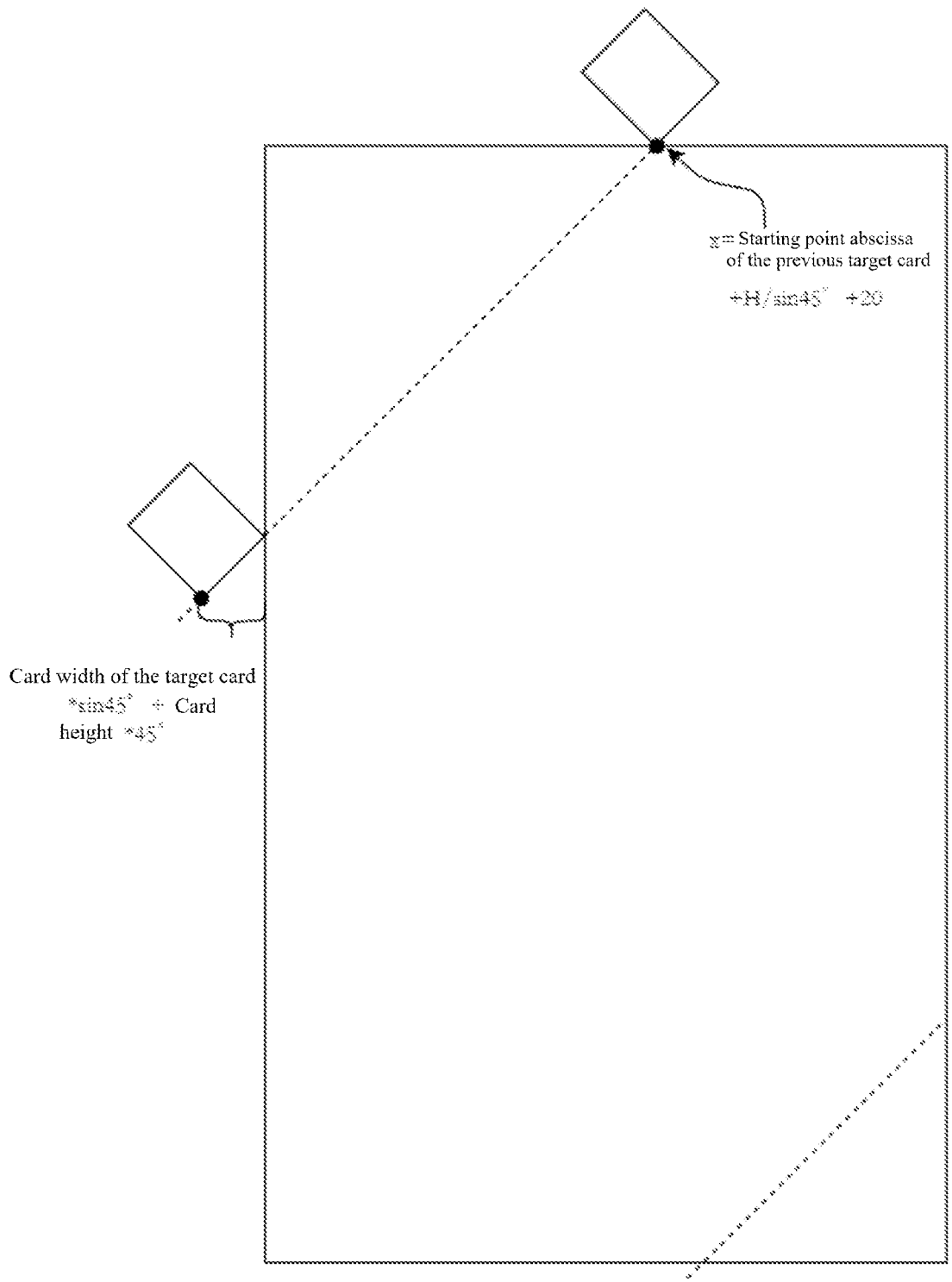
FIG. 8 is a schematic diagram schematically showing a setting of a motion track of each target card.

The following uses an example in which $\alpha$ is 45°. With reference to FIG. 7 and FIG. 8, the starting point abscissa and other parameters of each target card are explained. The starting point abscissa of the target card to enter the display interface is equal to a starting point abscissa of a previous target card to enter the display interface plus (a card height of the target card divided by sin 45°) plus 20 pixels (which may be customized).

As shown in FIG. 8, the end position for the target card to disappear from the display interface may also be calculated. The end position for the target card to disappear from the display interface is at the following distance outside the boundary: the card width of the target card multiplied by sin 45° plus the card height of the target card multiplied by 45°.

As an optional embodiment:

a starting point abscissa minimum value≤the starting point abscissa of the $i^{th}$ target card≤a starting point abscissa maximum value;

the starting point abscissa minimum value is equal to a width of the display interface divided by 3 (i.e., one-third of the width of the display interface); and the starting point abscissa maximum value is equal to the width of the display interface plus the height of the display interface divided by 4 multiplied by 3 (three-fourths of the height of the display interface);

where when a calculation result of the starting point abscissa of the $i^{th}$ target card is greater than the starting point abscissa maximum value, the starting point abscissa minimum value is set as the starting point abscissa of the $i^{th}$ target card.

In this optional embodiment, some areas such as the upper left corner and the lower right corner are not used for card display, to ensure that each target card can be completely presented in the display interface instead of flashing quickly, thereby ensuring the user's visual experience.

Figure 9:
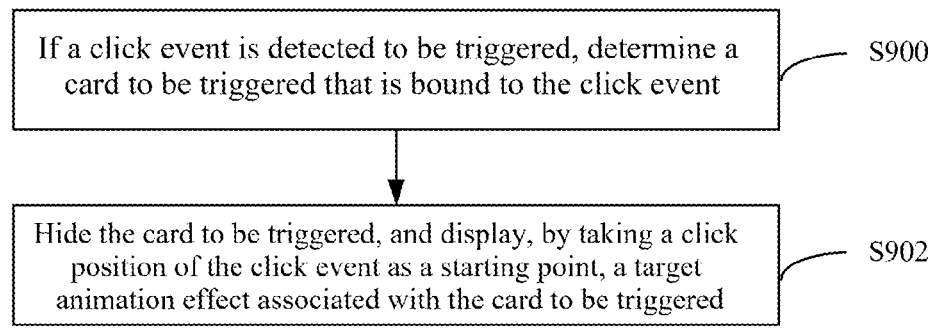
FIG. 9 schematically shows additional steps of the method for image bullet-screen comment interaction according to Embodiment 1 of the present application.

As an optional embodiment, as shown in FIG. 9, the method further includes: step S900: if a click event is detected to be triggered, determining a card to be triggered that is bound to the click event; and step S902: hiding the card to be triggered, and displaying, by taking a click position of the click event as a starting point, a target animation effect associated with the card to be triggered. In the process in which each bullet-screen comment falls along the target direction, the corresponding animation effect pops up based on the user input, which improves the interaction effect, thereby providing good user experience.

Figure 10:
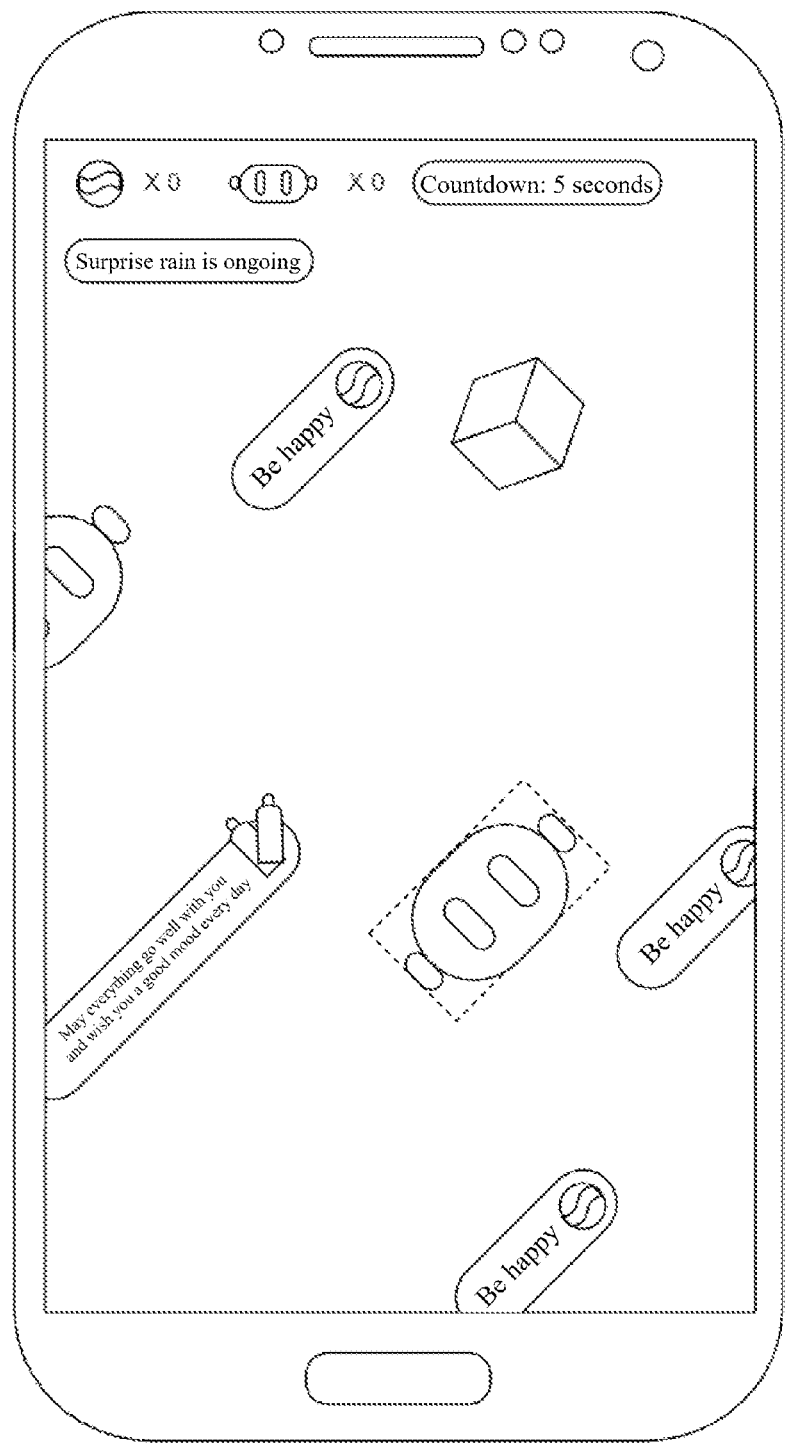
FIG. 10 schematically shows a triggerable area of a target card.

In this optional embodiment, a user's click operation is obtained, and whether the user's click operation is within the area of a specific target card (the dotted box as shown in FIG. 10) in the display interface is determined. If the user's click operation is within the area of the specific target card, a DOM node is created based on a click position of the click operation, to display the target animation feature (as shown in FIG. 11).

Figure 11:
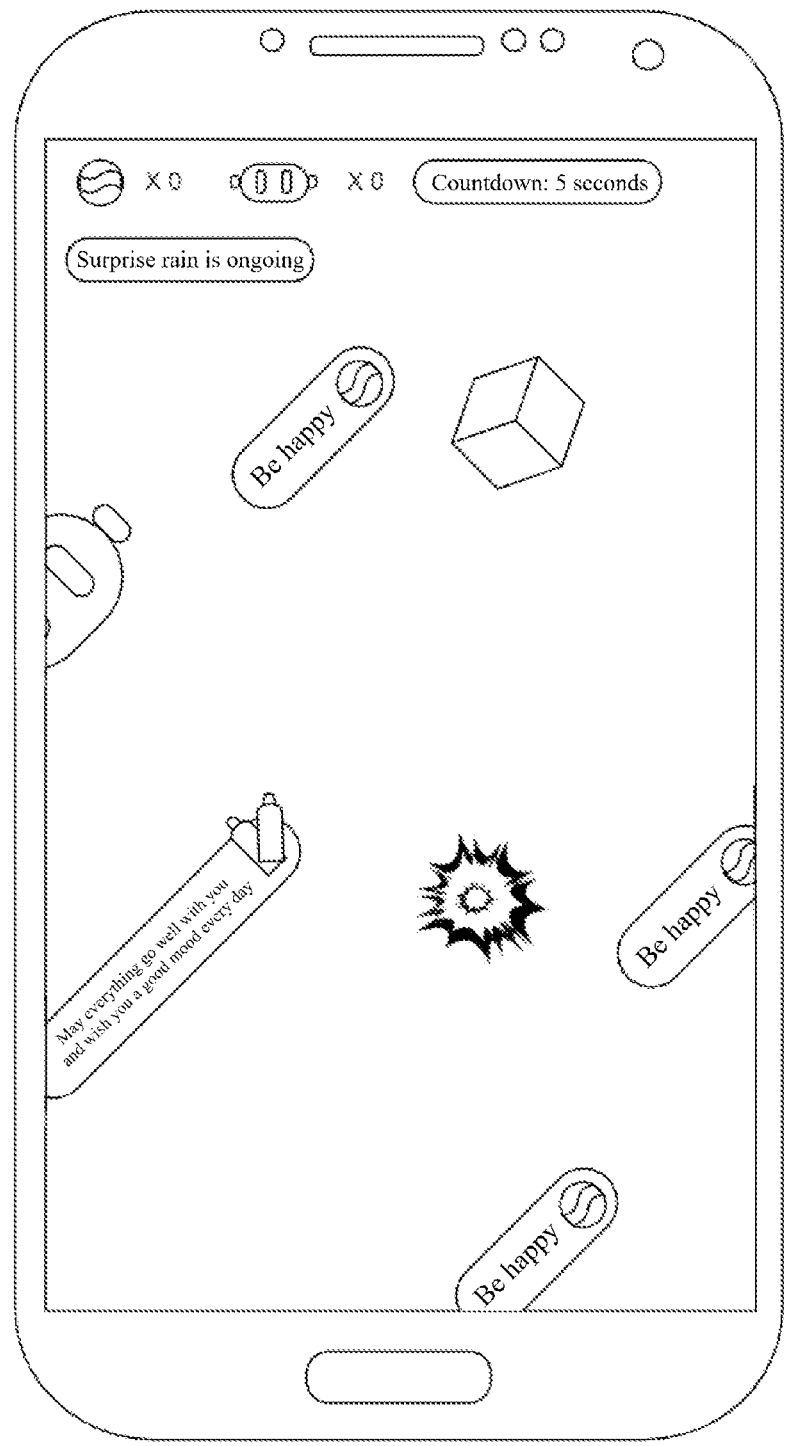
FIG. 11 schematically shows a display interface obtained after a target card is triggered.

As an optional embodiment, to enhance the animation effect, the target animation effect may be various effects, for example, an effect of fireworks blooming (as shown in FIG. 11); and
an effect of a falling star ball flying toward a target object.

As an optional embodiment, the target object is set at a predetermined position of the display interface and configured for providing a prompt of a game progress or the number of effective triggering times. The effect of falling star ball flying toward the target object may effectively guide the user to look at the above information.

As an optional embodiment, at least some of the plurality of cards have different shapes and sizes, for example, may be in shapes of rectangles, squares, and the like. Based on the cards having different shapes and sizes, the interaction effect of the user can be effectively improved.

As an optional embodiment, the target direction is between a horizontal mode and a vertical direction of the display interface. Each target card is rotated by an oblique angle, and moves on the display interface at the same oblique angle, which improves the interaction effect.

As an optional embodiment, the target direction is an oblique downward direction from right to left. For example, the target direction is an oblique downward direction of 45° from right to left. In this optional embodiment, the falling is implemented in a manner similar to a meteor shower, which improves the interaction effect.

Embodiment 2

Figure 12:
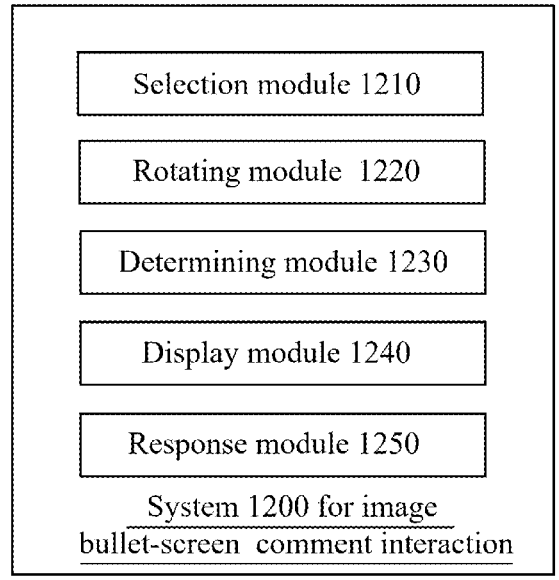
FIG. 12 schematically shows a block diagram of a system for image bullet-screen comment interaction according to Embodiment 2 of the present application.

FIG. 12 is a block diagram schematically showing a system for image bullet-screen comment interaction according to Embodiment 2 of the present application. The system for image bullet-screen comment interaction may be divided into one or more program modules, and the one or more program modules are stored in a storage medium and executed by one or more processors to implement the embodiments of the present application. The program modules in this embodiment of the present application refer to a series of computer program instruction segments that can complete a specific function. The functions of the program modules in this embodiment are specifically described in the following description.

As shown in FIG. 12, the system 1200 for image bullet-screen comment interaction may include:

a selection module 1210 configured to select a card to be displayed from a card pool according to a preset rule;

a rotating module 1220 configured to rotate the card to a target direction to obtain a target card;

a determining module 1230 configured to determine a motion track of the target card based on a motion track of a previous card;

a display module 1240 configured to display a bullet-screen comment on a display interface by using each target card based on a motion track of the target card; and a response module 1250 configured to: in response to a target bullet-screen comment in a plurality of bullet-screen comments that being triggered, display an animation effect associated with the target bullet-screen comment.

As an optional embodiment, the determining module 1230 is further configured to:

create a DOM node for each target card, each DOM node being bound to a click event; and configure animation code for each DOM node, the animation code being configured for defining the motion track of the target card.

As an optional embodiment, the determining module 1230 is further configured to:

set a different starting time point for the target card of each DOM node, where the starting time point is configured for indicating a starting time for the corresponding target card to enter the display interface.

As an optional embodiment, the determining module 1230 is further configured to:

if an $i^{th}$ target card is assigned a first motion track, set a default value for a starting point abscissa for the $i^{th}$ target card to enter the display interface, the $i^{th}$ target card being one of the target cards; and if the $i^{th}$ target card is not assigned the first motion track, calculate and set, according to a starting point abscissa of an $(i-1)^{th}$ target card and a card height divided by $\sin(\alpha)$, the starting point abscissa for the $i^{th}$ target card to enter the display interface, $\alpha$ representing an included angle between the target direction and a horizontal direction of the display interface.

As an optional embodiment:

a starting point abscissa minimum value≤the starting point abscissa of the $i^{th}$ target card≤a starting point abscissa maximum value;

the starting point abscissa minimum value is equal to the width of the display interface divided by 3; and the starting point abscissa maximum value is equal to the width of the display interface plus the height of the display interface divided by 4 multiplied by 3;

where if a calculation result of the starting point abscissa of the $i^{th}$ target card is greater than the starting point abscissa maximum value, the starting point abscissa minimum value is set as the starting point abscissa of the $i^{th}$ target card.

As an optional embodiment, the response module 1250 is further configured to:

if a click event is detected to be triggered, determine a card to be triggered that is bound to the click event; and hide the card to be triggered, and display, by taking a click position of the click event as a starting point, a target animation effect associated with the card to be triggered.

As an optional embodiment, the target animation effect includes:

an effect of fireworks blooming; or
an effect of a falling star ball flying toward a target object.

As an optional embodiment:

the target object is set at a predetermined position of the display interface and configured for providing a prompt of a game progress or the number of effective triggering times.

As an optional embodiment:

at least some of the plurality of cards have different shapes and sizes.

As an optional embodiment, the target direction is between a horizontal mode and a vertical direction of the display interface.

As an optional embodiment, the target direction is an oblique downward direction from right to left.

Embodiment 3

Figure 13:
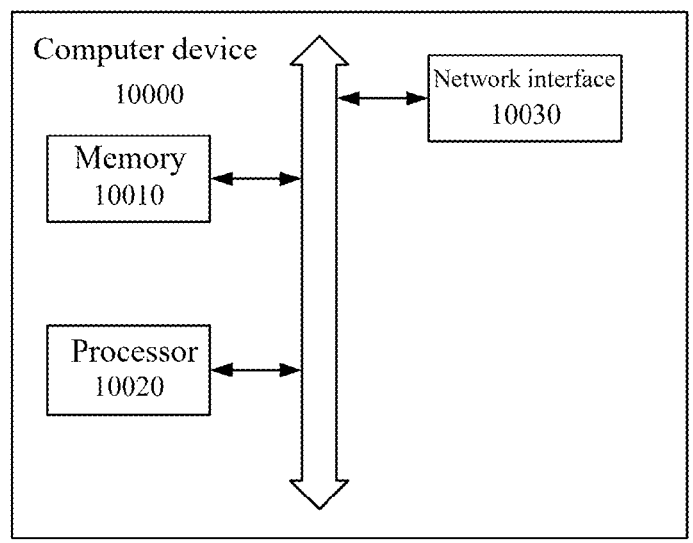
FIG. 13 is a schematic diagram schematically showing a hardware architecture of a computer device adapted to implement a method for image bullet-screen comment interaction according to Embodiment 3 of the present application.

FIG. 13 is a schematic diagram schematically showing a hardware architecture of a computer device adapted to implement a method for image bullet-screen comment interaction according to Embodiment 3 of the present application. In this embodiment, the computer device 10000 may alternatively be used as the computer device 6 or a component part of the computer device 6. In this embodiment, the computer device 10000 is a device that can automatically perform numerical calculation and/or information processing according to preset or prestored instructions, for example, a terminal device such as a smartphone, a tablet computer, a computer, a projector, a set-top box, a game console, a virtual device, or the like.

In this embodiment, the computer device 10000 is a device that can automatically perform numerical calculation and/or information processing according to preset or prestored instructions. As shown in FIG. 13, the computer device 10000 at least includes, but is not limited to, a memory 10010, a processor 10020, and a network interface 10030, which may be communicatively linked to each other by using a system bus.

The memory 10010 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 10010 may be an internal storage module of the computer device 10000, for example, a hard disk or memory of the computer device 10000. In some other embodiments, the memory 10010 may alternatively be an external storage device of the computer device 10000, for example, a plug-in type hard disk equipped on the computer device 10000, a smart media card (SMC for short), a secure digital (SD for short) card, or a flash card. Certainly, the memory 10010 may alternatively include both the internal storage module of the computer device 10000 and the external storage device of the computer device 10000. In this embodiment, the memory 10010 is generally configured to store an operating system and various application software installed in the computer device 10000, such as program code for the method for image bullet-screen comment interaction. In addition, the memory 10010 may be further configured to temporarily store various types of data that have been output or are to be output.

The processor 10020 may be, in some embodiments, a central processing unit (CPU for short), a controller, a microcontroller, a microprocessor, or other data processing chips. The processor 10020 is generally configured to control overall operation of the computer device 10000, for example, execute control, processing, and the like related to data exchange or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and other computer devices. For example, the network interface 10030 is configured to connect the computer device 10000 to an external terminal by using a network, and establish a data transmission channel, a communication link, and the like between the computer device 10000 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 13 shows only a computer device having components 10010 to 10030, but it should be understood that not all of the illustrated components are required to be implemented, and more or fewer components may be implemented instead.

In this embodiment, the method for image bullet-screen comment interaction stored in the memory 10010 may alternatively be divided into one or more program modules and executed by one or more processors (by the processor 10020 in this embodiment) to implement the present application.

Embodiment 4

The embodiment of the present application further provides a computer-readable storage medium having a computer program stored thereon, where the computer program, when executed by a processor, implements the steps of the method for image bullet-screen comment interaction in the embodiment.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed in the computer device, such as program code for the method for image bullet-screen comment interaction in the embodiments. In addition, the computer-readable storage medium may be configured to temporarily store various types of data that have been output or are to be output.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method, comprising:
   selecting a card to be displayed on a display interface from a card pool based on a predetermined rule;
   rotating the card to a target direction to obtain a target card;
   determining a motion track of the target card based on a motion track of a previous target card that enters the display interface immediately prior to the target card;
   displaying a comment using one of a plurality of target cards, the plurality of target cards configured to move on the display interface based on a motion track corresponding to each of the plurality of target cards;
   displaying an animation effect associated with a target card among the plurality of target cards in response to determining that the target card among the plurality of target cards is triggered;
   wherein the method further comprises:
   creating a document object model (DOM) node for each target card, each DOM node being bound to a click event; and
   configuring animation code for each DOM node, the animation code configured to define a motion track of a target card corresponding to each DOM node.

2. The method according to claim 1, further comprising:
   setting a starting time point for each DOM node, wherein the starting time point indicates a starting time of a corresponding target card entering the displaying interface, and the starting time point for each DOM node is different from each other.

3. The method according to claim 1, further comprising:
   in response to determining that an $i^{th}$ target card is not assigned a first motion track, determining an abscissa of a starting location point of the $i^{th}$ target card entering the display interface based on an abscissa of a starting location point of an $(i-1)^{th}$ target card and a card height of the $i^{th}$ target card divided by $\sin(\alpha)$, wherein the $i^{th}$ target card represents one of the plurality of target cards, $(i-1)^{th}$ the target card represents a previous target card relative to the $i^{th}$ target card, and $\alpha$ represents an included angle between a target direction of the $i^{th}$ target card and a horizontal direction of the display interface.

4. The method according to claim 3,
   wherein the abscissa of the starting location point of the $i^{th}$ target card is greater than or equal to a minimum value of an abscissa of a starting location point, and the abscissa of the starting location point of the $i^{th}$ target card is less than or equal to a maximum value of the abscissa of the starting location point;
   wherein the minimum value is equal to one-third of a width of the display interface, and the maximum value is equal to a sum of the width of the display interface and three-fourths of a height of the display interface; and
   wherein the minimum value is assigned as the abscissa of the starting location point of the $i^{th}$ target card when a determined result of the abscissa of the starting location point of the $i^{th}$ target card is greater than the maximum value.

5. The method according to claim 1, further comprising:
   in response to detecting that a click event is triggered, determining a target card corresponding to a DOM node bound to the detected click event;
   determining a click position of the click event on the display interface;
   causing to hide the target card corresponding to the detected click event; and
   displaying a target animation effect associated with the target card corresponding to the detected click event using the click position as a starting point of the target animation effect.

6. The method according to claim 5, wherein the target animation effect comprises:
   an effect of blooming fireworks; or
   or an effect of a falling star ball flying toward a target object.

7. The method according to claim 6, wherein the target object is set at a predetermined position on the display interface and configured to provide a prompt of a game progress or a number of triggering times.

8. The method according to claim 1, wherein at least some of the plurality of target cards have different shapes and different sizes.

9. The method according to claim 1, wherein the target direction is between a horizontal direction and a vertical direction of the display interface.

10. The method according to claim 9, wherein the target direction is an oblique downward direction from right to left.

11. A system, comprising:
    at least one processor; and
    at least one memory comprising computer-readable instructions that upon execution by the at least one processor cause the system to perform operations comprising:
    selecting a card to be displayed on a display interface from a card pool based on a predetermined rule;
    rotating the card to a target direction to obtain a target card;
    determining a motion track of the target card based on a motion track of a previous target card that enters the display interface immediately prior to the target card;
    displaying a comment using one of a plurality of target cards, the plurality of target cards configured to move on the display interface based on a motion track corresponding to each of the plurality of target cards;
    displaying an animation effect associated with a target card among the plurality of target cards in response to determining that the target card among the plurality of target cards is triggered;
    wherein the operations further comprise:
    creating a document object model (DOM) node for each target card, each DOM node being bound to a click event; and
    configuring animation code for each DOM node, the animation code configured to define a motion track of a target card corresponding to each DOM node.

12. The system according to claim 11, the operations further comprising:
    setting a starting time point for each DOM node, wherein the starting time point indicates a starting time of a corresponding target card entering the displaying interface, and the starting time point for each DOM node is different from each other.

13. The system according to claim 11, the operations further comprising:

in response to determining that an $i^{th}$ target card is not assigned a first motion track, determining an abscissa of a starting location point of the $i^{th}$ target card entering the display interface based on an abscissa of a starting location point of an $(i-1)^{th}$ target card and a card height of the $i^{th}$ target card divided by $\sin(\alpha)$, wherein the $i^{th}$ target card represents one of the plurality of target cards, $(i-1)^{th}$ the target card represents a previous target card relative to the $i^{th}$ target card, and $\alpha$ represents an included angle between a target direction of the $i^{th}$ target card and a horizontal direction of the display interface.

14. The system according to claim 11, the operations further comprising:

in response to detecting that a click event is triggered, determining a target card corresponding to a DOM node bound to the detected click event;

determining a click position of the click event on the display interface;

causing to hide the target card corresponding to the detected click event; and displaying a target animation effect associated with the target card corresponding to the detected click event using the click position as a starting point of the target animation effect.

15. The system according to claim 11, wherein at least some of the plurality of target cards have different shapes and different sizes.

16. The system according to claim 11, wherein the target direction is an oblique downward direction between a horizontal direction and a vertical direction of the display interface.

17. A non-transitory computer-readable storage medium, storing computer-readable instructions that upon execution by a processor cause the processor to implement operations, the operation comprising:

selecting a card to be displayed on a display interface from a card pool based on a predetermined rule;

rotating the card to a target direction to obtain a target card;

determining a motion track of the target card based on a motion track of a previous target card that enters the display interface immediately prior to the target card;

displaying a comment using one of a plurality of target cards, the plurality of target cards configured to move on the display interface based on a motion track corresponding to each of the plurality of target cards;

displaying an animation effect associated with a target card among the plurality of target cards in response to determining that the target card among the plurality of target cards is triggered;

wherein the operations further comprise:

creating a document object model (DOM) node for each target card, each DOM node being bound to a click event; and configuring animation code for each DOM node, the animation code configured to define a motion track of a target card corresponding to each DOM node.

\* \* \* \* \*